United States Patent
Ash et al.

(10) Patent No.: US 9,864,686 B2
(45) Date of Patent: Jan. 9, 2018

(54) RESTRICTION OF VALIDATION TO ACTIVE TRACKS IN NON-VOLATILE STORAGE DURING A WARMSTART RECOVERY

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 14/883,382

(22) Filed: Oct. 14, 2015

(65) Prior Publication Data

US 2017/0109283 A1    Apr. 20, 2017

(51) Int. Cl.
*G06F 12/08* (2016.01)
*G06F 12/0815* (2016.01)
*G06F 12/0873* (2016.01)
*G06F 12/0868* (2016.01)

(52) U.S. Cl.
CPC ...... *G06F 12/0815* (2013.01); *G06F 12/0868* (2013.01); *G06F 12/0873* (2013.01); *G06F 2212/1032* (2013.01); *G06F 2212/281* (2013.01); *G06F 2212/313* (2013.01); *G06F 2212/604* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 5,815,656 A * | 9/1998 | Candelaria | G06F 11/0727 714/48 |
| 6,425,050 B1 | 7/2002 | Beardsley et al. | |
| 7,895,465 B2 | 2/2011 | Ash | |
| 2003/0051113 A1* | 3/2003 | Beardsley | G06F 12/0866 711/163 |
| 2003/0070041 A1* | 4/2003 | Beardsley | G06F 11/0724 711/113 |
| 2004/0250022 A1* | 12/2004 | Jarvis | G06F 12/0866 711/118 |
| 2005/0198446 A1* | 9/2005 | Ash | G06F 11/2089 711/149 |
| 2008/0104344 A1* | 5/2008 | Shimozono | G06F 11/1441 711/162 |
| 2014/0082254 A1 | 3/2014 | Ash | |
| 2014/0229676 A1* | 8/2014 | Biswas | G06F 12/0808 711/119 |
| 2016/0085460 A1* | 3/2016 | Chandrashekar | G06F 3/0617 711/130 |

OTHER PUBLICATIONS

B. Dufrasne, et al. "IBM D58870 Architecture and Implementation (Release 7.5)", IBM Corporation, Redbooks, Document 5G24-8085-05, Jul. 2015, pp. 474.

* cited by examiner

*Primary Examiner* — Kaushikkumar Patel
(74) *Attorney, Agent, or Firm* — Rabindranath Dutta; Konrad Raynes Davda & Victor LLP (57) ABSTRACT

A storage system, maintains a cache and a non-volatile storage. Active tracks in the non-volatile storage are determined. The determined active tracks in the non-volatile storage are validated between the cache and the non-volatile storage during a warmstart recovery.

20 Claims, 11 Drawing Sheets

RESTRICTION OF VALIDATION TO ACTIVE TRACKS IN NON-VOLATILE STORAGE DURING A WARMSTART RECOVERY

BACKGROUND

1. Field

Embodiments relate to the restriction of validation to active tracks in non-volatile storage during a warmstart recovery.

2. Background

A storage system may control access to storage for one or more host computational devices that may be coupled to the storage system over a network. A storage management application that executes in the storage system may manage a plurality of storage devices, such as disk drives, tape drives, flash drives, etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may have a plurality of processor cores and the servers may share the workload of the storage system. In a two server configuration of the storage system, either server can failover to the other if there is a failure or a planned downtime for one of the two servers.

The storage system attempts to maintain two copies of the data while data is moving through the storage system. The servers have two areas of their primary memory that are used for holding host data: cache and non-volatile storage (NVS). NVS contains write data until the data is destaged from the cache to the storage drives. When a write is sent to a volume and both the servers are operational, the write data is placed into the cache of the owning server and into the NVS of the other server. The NVS copy of the write data may be accessed if a write failure occurs and the cache is empty or possibly invalid in the owning server. Otherwise, the NVS copy of the write data is discarded after the destage from cache to the storage drives is complete.

SUMMARY OF THE PREFERRED EMBODIMENTS

Provided are a method, a system, a computer program product in which a storage system maintains a cache and a non-volatile storage. Active tracks in the non-volatile storage are determined. The determined active tracks in the non-volatile storage are validated between the cache and the non-volatile storage during a warmstart recovery.

In additional embodiments, the non-volatile storage is a write cache, and determining that a track is active in the cache is based on a count of active writers and active users for the track.

In further embodiments, the track that is active in the cache is added to a list of non-volatile storage tracks that are to be validated, in response to determining that the track that is active in the cache is also present in the non-volatile storage, wherein the list of non-volatile storage tracks that are to be validated comprise the active tracks in the non-volatile storage.

In additional embodiments, not all tracks in the non-volatile storage are validated.

In further embodiments, for a first category of tracks that do not have existing segments in the non-volatile storage and only has new segments for a current write in the non-volatile storage, the cache sends a list of new non-volatile storage segments for a track to the non-volatile storage to determine if any of the segments are used for the track.

In yet further embodiments, for a second category of tracks that has existing segments in the non-volatile storage and may have new segments for a current write in the non-volatile storage, the cache sends a non-volatile storage segment number where a non-volatile storage control block should exist, to the non-volatile storage.

In certain embodiments, if a non-volatile storage control block is found for the track then the non-volatile storage control block is sent to the cache to be validated with a cache track.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a mechanism for validating only active tracks of a non-volatile storage, between the cache and the non-volatile storage during a warmstart. The embodiments reduce the number of storage tracks to validate in comparison to mechanisms in which all storage tracks whose segments are found the NVS are validated.

Exemplary Embodiments

Figure 1:
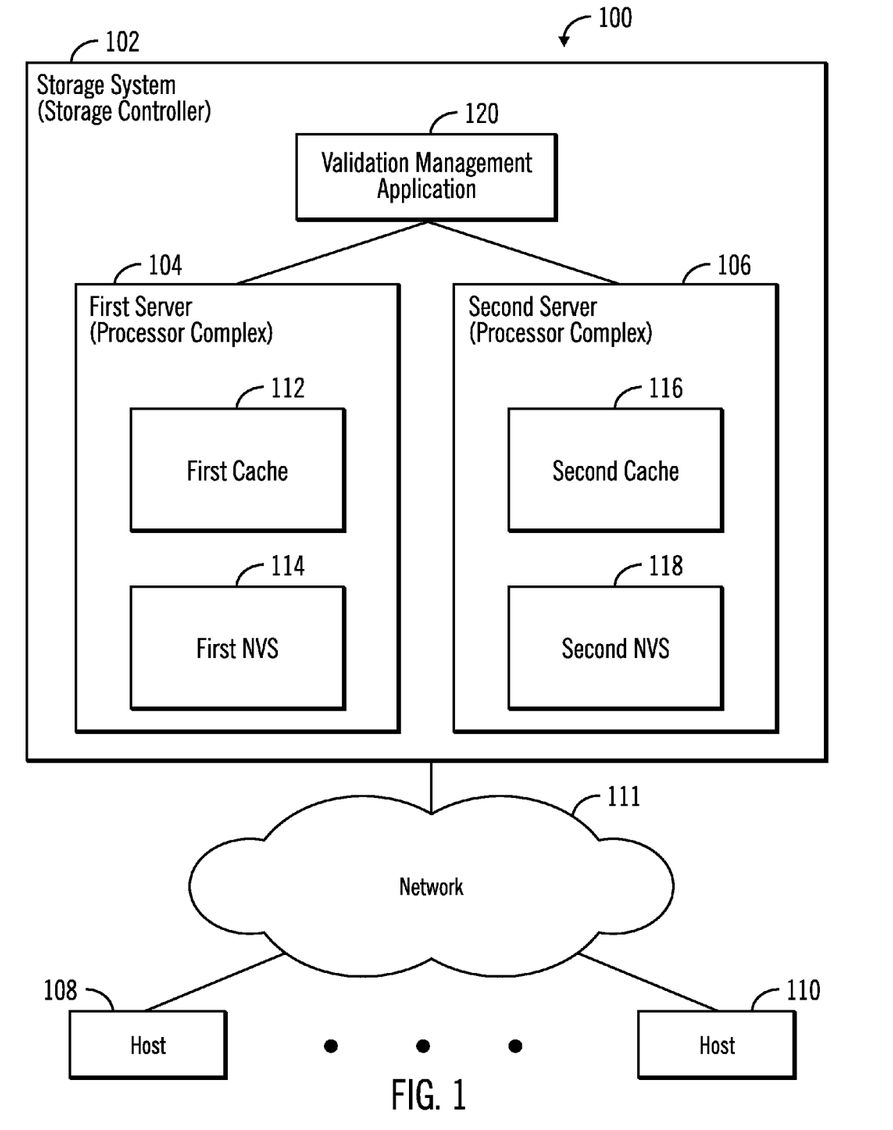
FIG. 1 illustrates a block diagram of a computing environment comprising a storage system comprising a first server and a second server, where the storage system communicates with a plurality of hosts over a network, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network 111, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex and may include one or more processors and/or processor cores.

The storage system 102, the servers 104, 106 and the hosts 108, 110 may be elements in any suitable network 111, such as, a storage area network, a wide area network, the Internet, an intranet. In certain embodiments, storage system 102, the servers 104, 106 and the hosts 108, 110 may be elements in a cloud computing environment.

The first server 104 includes memory comprising a first cache 112 and a first NVS 114, and the second server 106 includes memory comprising a second cache 116 and a second NVS 118.

The cache 112, 116 may in certain embodiments may comprise a write cache partitioned into one or more ranks, where each rank may include one or more storage tracks. The cache 112, 116 may be any suitable cache known in the art or developed in the future. In some embodiments, the cache 112, 116 may be implemented with a volatile memory and/or non-volatile memory. The cache 112, 116 may store both modified and unmodified data, where the cache 112,116 may periodically destage (i.e., move) data from the cache 112, 116 to storage drives controlled by the servers 104, 106.

The NVS 114, 118 may also be referred to as a "persistent" cache and is implemented with non-volatile memory that may or may not utilize external power to retain data stored therein. In some embodiments, a backup power source, such as a battery, supplies the NVS 114, 118 with power to retain the data stored therein in case of power loss. The NVS 114, 118 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. NVS is protected by battery backup. Normal access to the data is from the copy retained in the cache. In certain embodiments, the NVS 114, 118 may also act like a write cache.

In certain embodiments, a validation management application 120 that executes in the storage system 102 provides a mechanism for validating only active non-volatile storage tracks between the first cache 112 and the second NVS 118, or between the second cache 116 and the first NVS 114, during a warmstart to reduce the number of storage tracks to validate in comparison to mechanisms in which all storage tracks found in an NVS are validated. The validation management application 120 may execute in any or all of the servers 104, 106 or may be an application that executes when virtualization is performed to access the hardware elements of the storage system 102. In certain embodiments, the validation management application 120 may be implemented in software, firmware, hardware or any combination thereof.

It should be noted that the storage system 102 may be configured and accessed in many different ways. For example, virtualization may be performed to access the hardware elements of the storage system 102. Additionally, in certain embodiments, the storage system 102 may have a single server or more than two servers.

Figure 2:
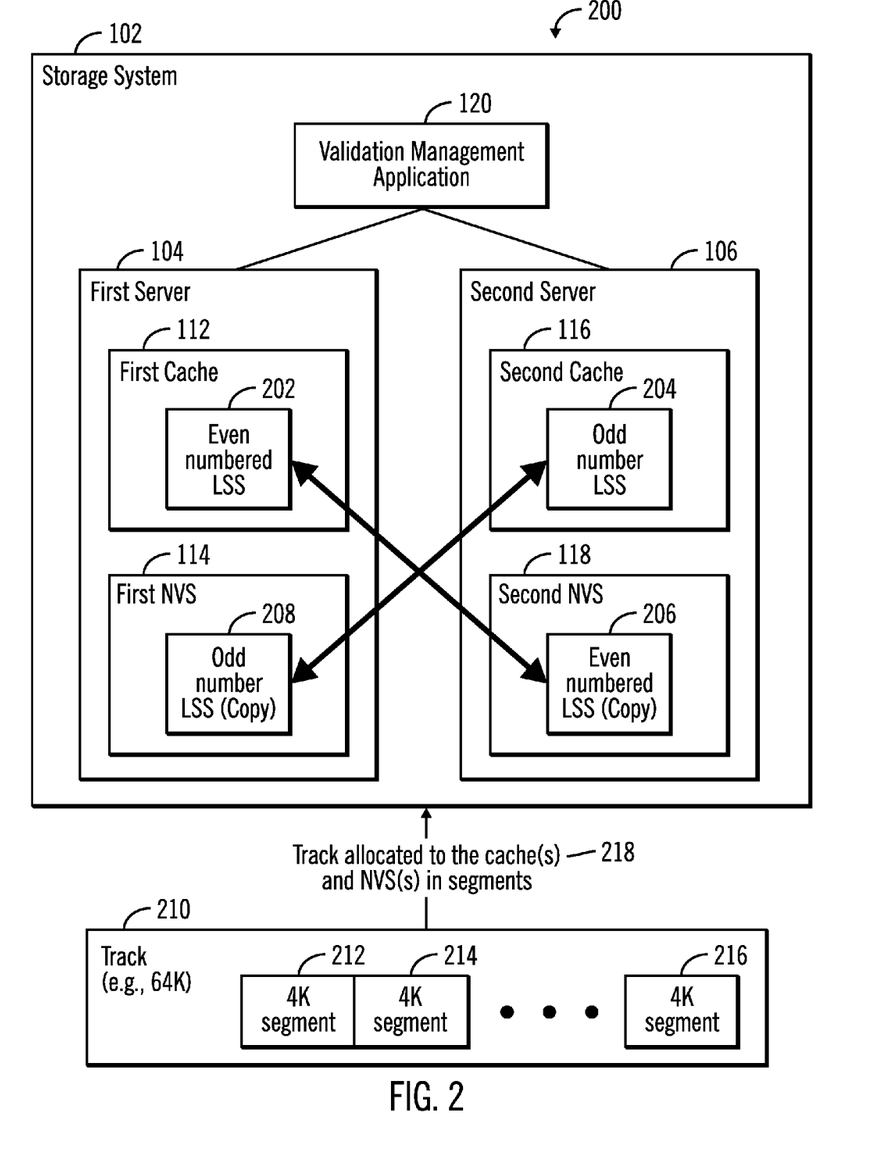
FIG. 2 illustrates a block diagram of the storage system with a first cache and a first NVS controlled by the first server, and a second cache and a second NVS controlled by the second server, in accordance with certain embodiments.

FIG. 2 illustrates a block diagram 200 of the storage system 102 with a first cache 112 and a first NVS 114 controlled by the first server 104, and a second cache 116 and a second NVS 118 controlled by the second server 106, in accordance with certain embodiments.

The first cache 112 is used for all logical volumes that are members of even numbered logical storage systems (LSS) 202. It may be noted than an LSS is a logical construct that groups logical volumes and logical units (LUN) in groups, where in certain embodiments the LSSs may be numbered via integers starting from 0 to and ending at 255 if there are 256 LSSs. Likewise, the second cache 116 is used for all logical volumes that are members of odd numbered LSSs 204. For every write that is placed into the first cache 112 of the first server 104, a copy 206 is placed into the second NVS 118 that is in the second server 106. For every write that is placed into the second cache 116 of the second server 106, a copy 208 is placed into the first NVS 114 that is in the first server 104. As a result, in case of failure of the first server 104, the second server 106 may be used for recovery of data, and in case of failure of the second server 106 the first server 104 may be used for the recovery of data.

In certain embodiments, each track (an exemplary track 210 is shown) may be 64 Kbytes in size. A track is divided into segments of sectors, which may comprise a basic unit of storage. The exemplary track 210 may be comprised of 4 Kbyte segments 212, 214, 216, where the track 210 is allocated to the cache 112, 116 and NVS 114, 118 in segments of 4 Kbytes, i.e., a subset of segments of the track 210 may be reside in the cache 112, 116 and NVS 114, 118.

In certain embodiments shown in FIG. 2, the validation management application 120 maintains the first cache 112 in synchronization with the second NVS 118, and the second cache 116 in synchronization with the first NVS 114, where in certain embodiments the validation management application 120 may comprise one or more applications or may be part of another application. The validation management application 120 may execute in one or both of the servers 104, 106 and/or the storage system 102. The validation management application 120 may validate only active non-volatile storage tracks between the cache and the non-volatile storage during a warmstart recovery to reduce recovery time for warmstart.

In FIG. 2, for every write that is placed into the first cache 112 of the first server 104, a copy is placed into the NVS 118 that is in the second server 106. Thus, the following normal flow of data is for a write from a host when both the first server 104 and the second server 106 are operational:

(1) Data is written to cache 112 in the first server 104. At the same time, data is written to NVS 118 of the a second server 106;
(2) The write operation is reported to the host as completed;
(3) The write data is destaged from the first cache 112 of the first server 104 to a storage drive array; and
(4) The write data is discarded from the NVS 118 of the second server 106.

Therefore, the cache has both modified and unmodified data for a track, whereas the NVS has modified data. When a track gets destaged to a disk, the track is then unmodified, and the track has then to be discarded from the NVS as the NVS only stores modified data.

Therefore a host writes to both the cache 112 and NVS 118 in parallel. A write to cache takes place in two phases. In the first phase track access is taken and the track is associated with a "write in progress". Then in a second phase the track access ends and the write completes. When a host writes a track into NVS, then after writing the track a commit is performed to indicate that write is complete. Therefore, a cache has a "write in progress" state whereas NVS has a "commit message" but no write in progress.

Figure 3:
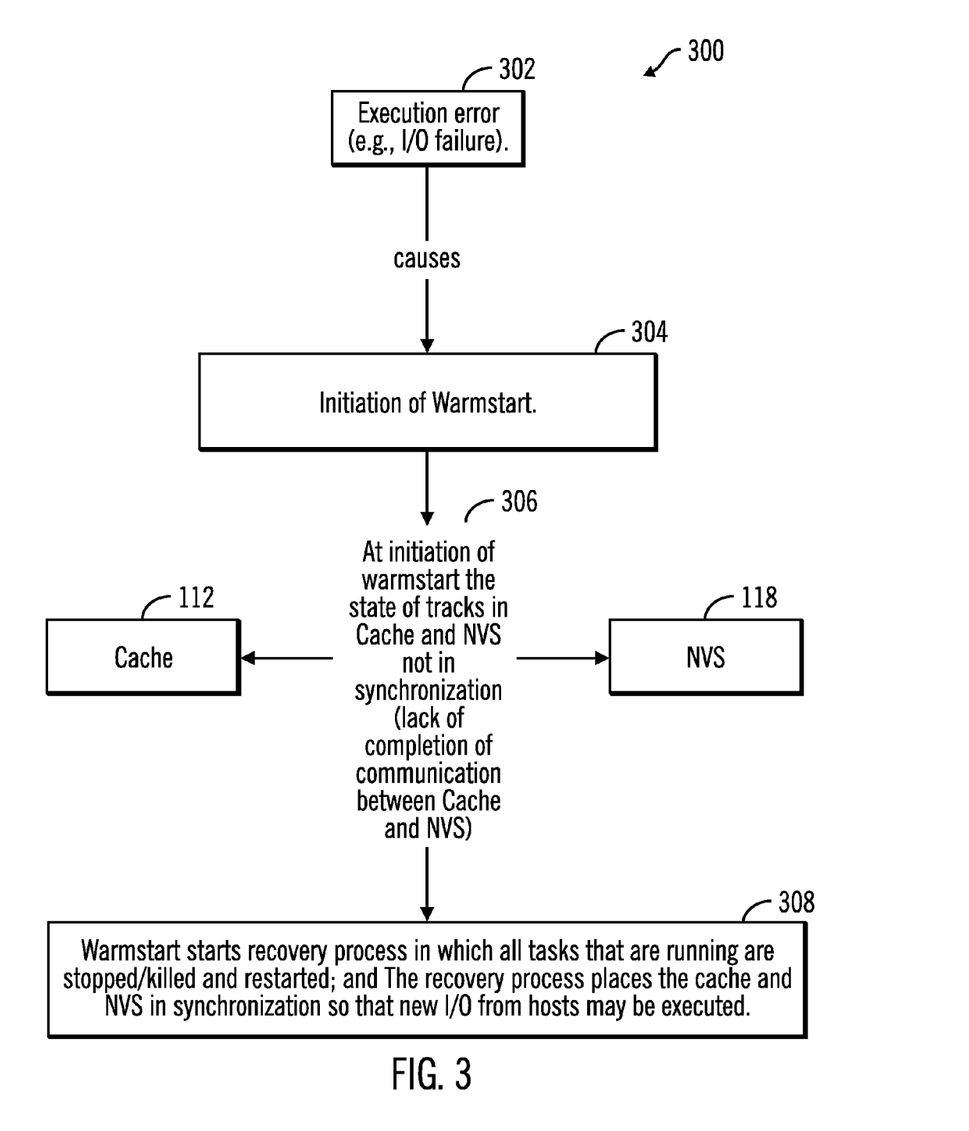
FIG. 3 illustrates a diagram that shows operations performed during a warmstart process, in accordance with certain embodiments.

FIG. 3 illustrates a diagram 300 that shows operations performed during a warmstart process, in accordance with certain embodiments. A warmstart may be used as a recovery method in case of an execution error, such as an I/O failure. The warmstart collects state-save data. The warmstart may allow the storage system 102 to reinitialize certain data structures, rebuild linked lists, and restore the storage system 102 to a more known state. During the warmstart, there are periods of time where I/O may be blocked and therefore may have to be restarted. Therefore, the duration of the warmstart should be low to minimize the impact on the storage system 102.

In FIG. 3, an execution error 302, such as an I/O failure may cause an initiation of warmstart (reference numeral 304). At initiation of warmstart the state of tracks in the cache 112 and NVS 118 may not in synchronization because of lack of completion of communication between the cache 112 and the NVS 118 at the point in which the execution error occurred (as shown via reference numeral 306).

When a warmstart is initiated, the state of a track in cache 112 and NVS 118 are not guaranteed to be in synchronization. For example, the track in cache 112 could be "write in Progress," but if the NVS 118 did not receive a "commit" message from the host (e.g., host 108) prior to the initiation of the warmstart, then the track may not even exist in NVS 118. Likewise, if the track in cache 112 is in the process of being discarded from NVS 118, and the "discard" message was received and processed prior to the warmstart, but the "discard complete" message was not received in the cache 112 prior to the initiation of the warmstart, then the track will not exist in the NVS 118, while the cache 112 still indicates that it does. Various schemes may be used to address the synchronization issues between the cache 112 and the NVS 118, and to address the synchronization issues the warmstart starts (at block 308) a recovery process in which all tasks that are running are stopped/killed and restarted, and the recovery process places the cache 112 and NVS 118 in synchronization so that new I/O from the hosts 108, 110 may be executed.

Therefore, a lack of completion of communications between the NVS and cache may cause synchronization problems. The warmstart process goes through all tracks in cache and performs a validation.

Figure 4:
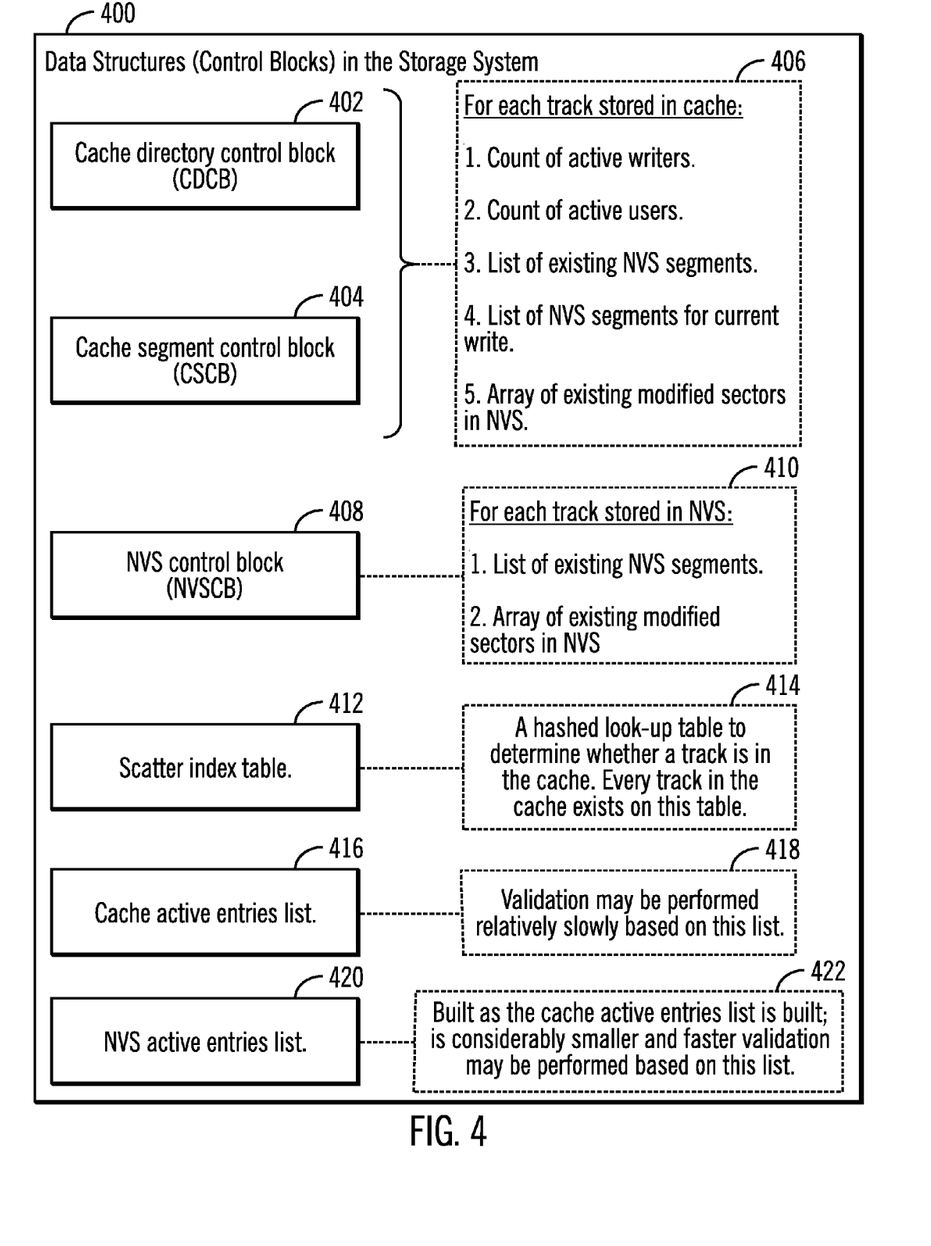
FIG. 4 illustrates a block diagram of data structures in the storage system, in accordance with certain embodiments.

FIG. 4 illustrates a block diagram 400 of data structures in the storage system 102, in accordance with certain embodiments. In certain embodiments, the data structure may also be referred to as control blocks and may be implemented in software, hardware, firmware, or any combination thereof.

A cache directory control block 402 and a cache segment control block 404 may for each track stored in the cache 112, 116 maintain the following (as shown via reference numeral 406):
1. Count of active writers;
2. Count of active users;
3. List of existing NVS segments;
4. List of NVS segments for current write; and
5. Array of existing modified sectors in NVS.

An NVS control block 408 may for each track stored in NVS maintain the following (as shown via reference numeral 410):
1. List of existing NVS segments; and
2. Array of existing modified sectors in NVS.

A scatter index table 412 may comprise a hashed look-up table to determine whether a track is in the cache 112, 116. Every track in the cache exists on the scatter index table 412 (as shown via reference numeral 414).

A cache active entries list 416 shows the tracks that are active in the cache. Validation may be performed relatively slowly based on the cache active entries list 416 (as shown via reference numeral 418).

A NVS active entries list 420 is built in certain embodiments as the cache active entries list 416 is built. The NVS active entries list 420 is considerably smaller, and faster validation may be performed based on the NVS active entries list 420 (as shown via reference numeral 422).

Because the cache and NVS may not be in synchronization for each track, in certain warmstart recovery mechanisms the NVS sends every NVSCB control block for every track that does exist in NVS, to the cache, and the cache validates every NVSCB and NVS segment to the cache tracks (CDCB/CSCB) and list of NVS segments used by each track. Once all tracks are validated, any cache track that indicated it was also in NVS, but was not, is reclaimed, and all NVS segments that were not used by an NVSCB, and thus not validated, are put back on the free queue. This extensive processing and recovery works fine on storage systems with moderate sized NVSs. However, in NVSs with large size such as 32 GB per processor complex, the time to validate every NVS track and every NVS segment may be too high to meet expected recovery times. With 32 GB NVS, there may be 4 million tracks to validate. At any point in time, in certain embodiments there may be a maximum of about 50,000 active tracks. Certain embodiments only validate the "active" NVS tracks between the cache and the NVS during warmstart recovery.

Figure 5:
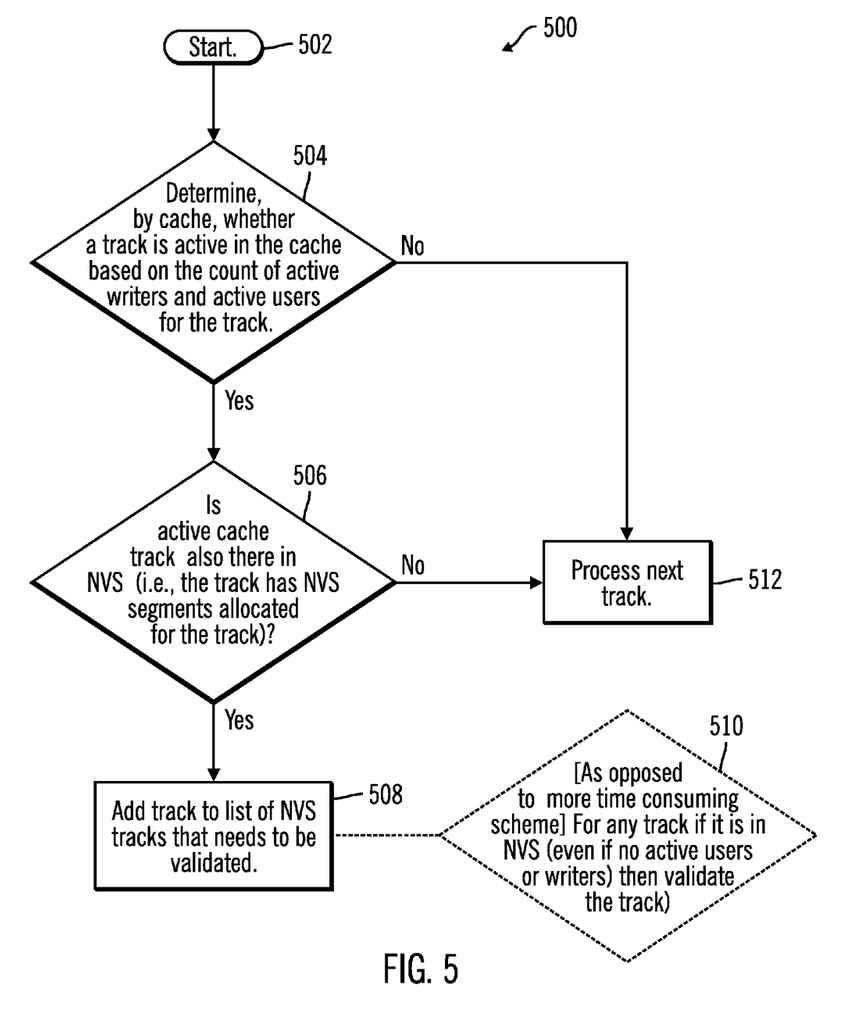
FIG. 5 illustrates a flowchart that shows operations in a warmstart process, in accordance with certain embodiments.

FIG. 5 illustrates a flowchart 500 that shows operations in a warmstart process, in accordance with certain embodiments. Control starts at block 502 and proceeds to block 504 in which the cache 112 determines whether a track is active in the cache 112 based on the count of active writes and active users for the track. If the track is active in the cache 112 ("Yes" branch from block 504) then control proceeds to block 506 in which it is determined whether the active cache track is also there in the NVS 118, i.e. a determination is made as to whether the track has NVS segments allocated for the track.

If the track has NVS segments allocated for the track then the active track is also there in the NVS ("Yes" branch from block 506) and control proceeds to block 508 in which the track is added to a list of NVS tracks that need to be validated. This is a faster mechanism in comparison to mechanisms in which any track which is in NVS is validated, even if there are no active users or writers for the track (as shown by reference numeral 510).

If at block 504 it is determined that the track is not active in the cache ("No" branch from block 504) or if at block 506 it is determined that the active cache track is not there in NVS ("No" branch from block 506) then control proceeds to block 512 where the next track is processed.

Figure 6:
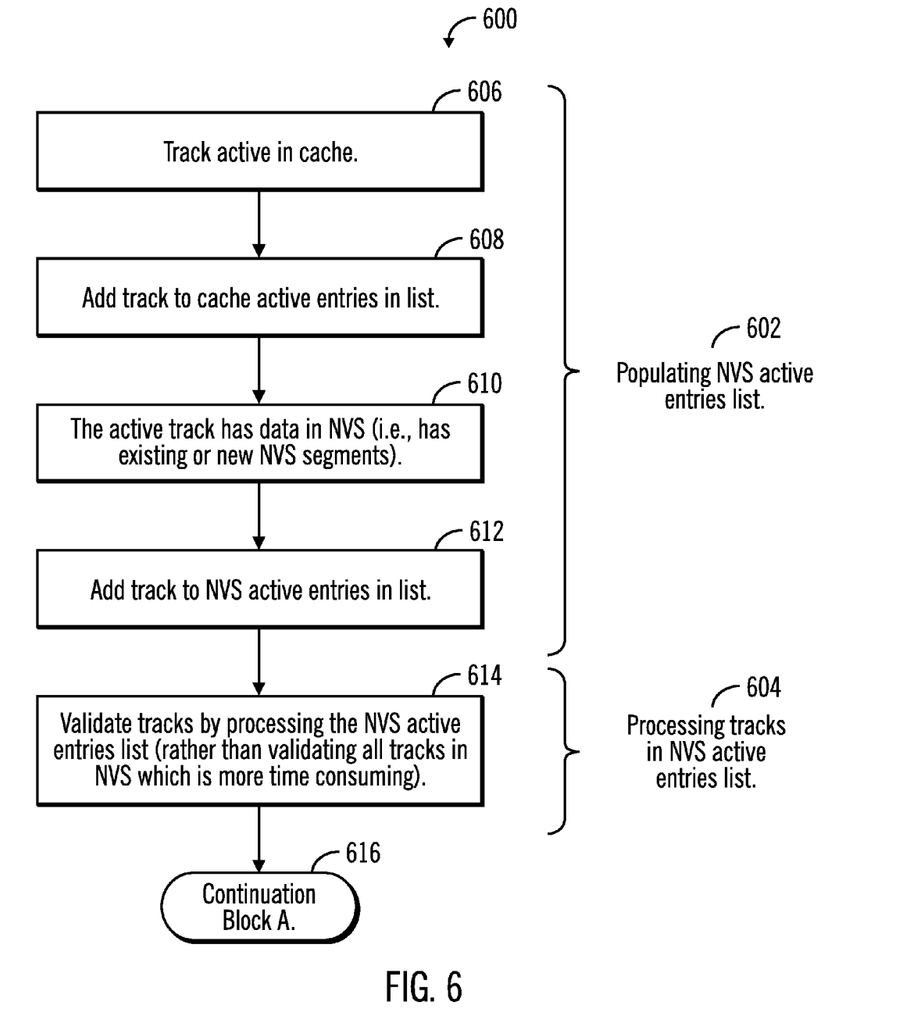
FIG. 6 illustrates a flowchart that shows operations that populate an NVS active entries list and then operations to process the NVS active entries list for validating tracks, in accordance with certain embodiments.

FIG. 6 illustrates a flowchart 600 that shows operations that populate an NVS active entries list (reference numeral 602) and then operations to process the NVS active entries list for validating tracks (reference numeral 604), in accordance with certain embodiments.

Control starts at block 606 in which a determination is made as to whether a track is active in the cache. To determine whether a track is active in the cache a processing is performed of all of the tracks in cache that exist in the scatter index table 412. During this processing, the cache already decides which tracks are "active" by looking at the count of active writers and count of active users. Any track that is, or may be in NVS, is also considered "active". Each active track is added to a cache active entries list 416 to be validated (at block 608). All tracks in cache that are not active will not be validated.

Then, if the active track has existing or new NVS segments (at block 610) [i.e., has data in NVS], then it is added to a new NVS Active Entries List (at block 612). The warmstart processing will only validate the NVS tracks that are on the NVS active entries list 420 (at block 614). Any cache track that was on the NVS active entries list 420, but was not validated by NVS, will be reclaimed, and all NVS segments for those tracks are put back on the free queue.

Figure 7:
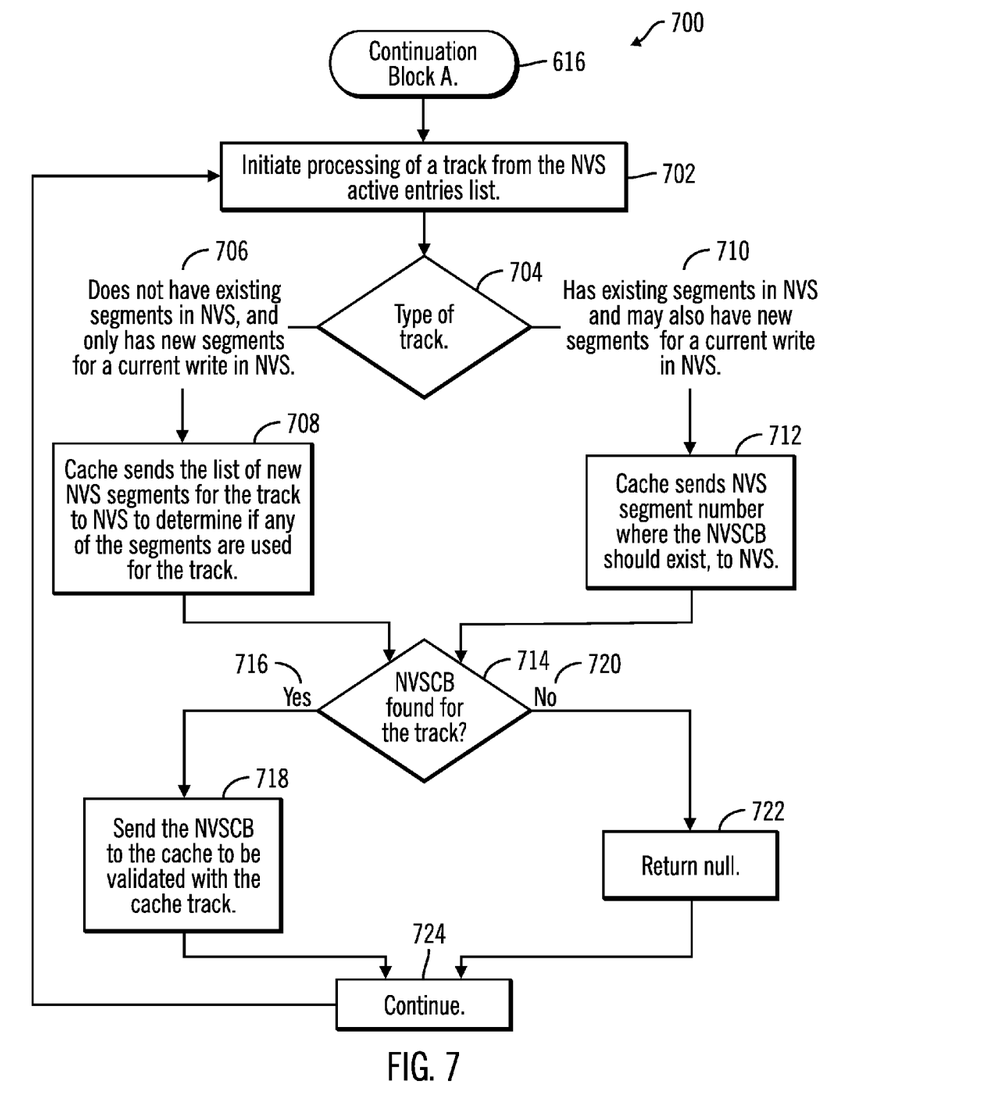
FIG. 7 illustrates a flowchart that shows processing of tracks in the NVS active entries list, in accordance with certain embodiments.

From block 614 control proceeds to continuation block A 616 for continuing the flowchart to FIG. 7.

FIG. 7 illustrates a flowchart that shows processing of tracks in the NVS active entries list 420, in accordance with certain embodiments;

From continuation block A 616 control proceeds to block 702 in which the storage system 102 initiates the processing of a track from the NVS active entries list 420.

Control proceeds to block 704 in which a determination is made as to the type of track. If the track does not have existing segments in NVS, and only has new segments for a current write in NVS (reference numeral 706) control proceeds to block 708 in which the cache sends the list of new NVS segments for the track to the NVS to determine if any of the segments are used for the track.

If at block 704 a determination is made that the track has existing segments in NVS and may also have new segments for a current write in NVS (reference 710) then control proceeds to block 712 in which the cache sends the NVS segment number where the NVSCB should exist to NVS.

From block 708 and block 712 control proceeds to block 714 in which a determination is made as to whether the NVSCB has been found for the track. If so ("Yes" branch 716) control proceeds to block 718 in which the NVSCB is sent to the cache to be validated with the cache track. If not ("No" branch 720) control proceeds to block 722 in which nothing is returned.

From block 718 and 722 control proceeds to block 724 and control continues to block 702 for initiating the processing of another track from the NVS active entries list 420.

Therefore FIG. 7 illustrates certain embodiments in which during recovery, each CPU processes a portion of the NVS active entries list 420. Each track on the NVS active entries list 420 is split into two categories. The first category is tracks that do not have existing segments in NVS, and only have new segments for a current write in NVS. These tracks may or may not exist in NVS, depending on whether a commit message arrived or not prior to the warmstart. The cache has to send the list of new NVS segments for the track to NVS to determine if any of the segments are used for the track. If an NVSCB is found for the track, then it is sent back to cache to be validated with the cache track. Otherwise, nothing is sent back.

The second category is tracks that have existing segments in NVS. These tracks may also have new segments for a current write in NVS. For each track that has existing segments in NVS, it is known which NVSCB control block should be used for the track. These tracks may or may not exist in NVS, depending on whether a discard message arrived or not prior to the warmstart. The cache may send the NVS segment number where the NVSCB should exist to NVS. If the NVSCB does exist, then it is sent back to cache to be validated with the cache track. Otherwise nothing is sent back. With this, only the "active" NVS tracks are validated, and the recovery time is greatly reduced. All non-active tracks continue to be verified mainline as commits or discards are processed.

Figure 8:
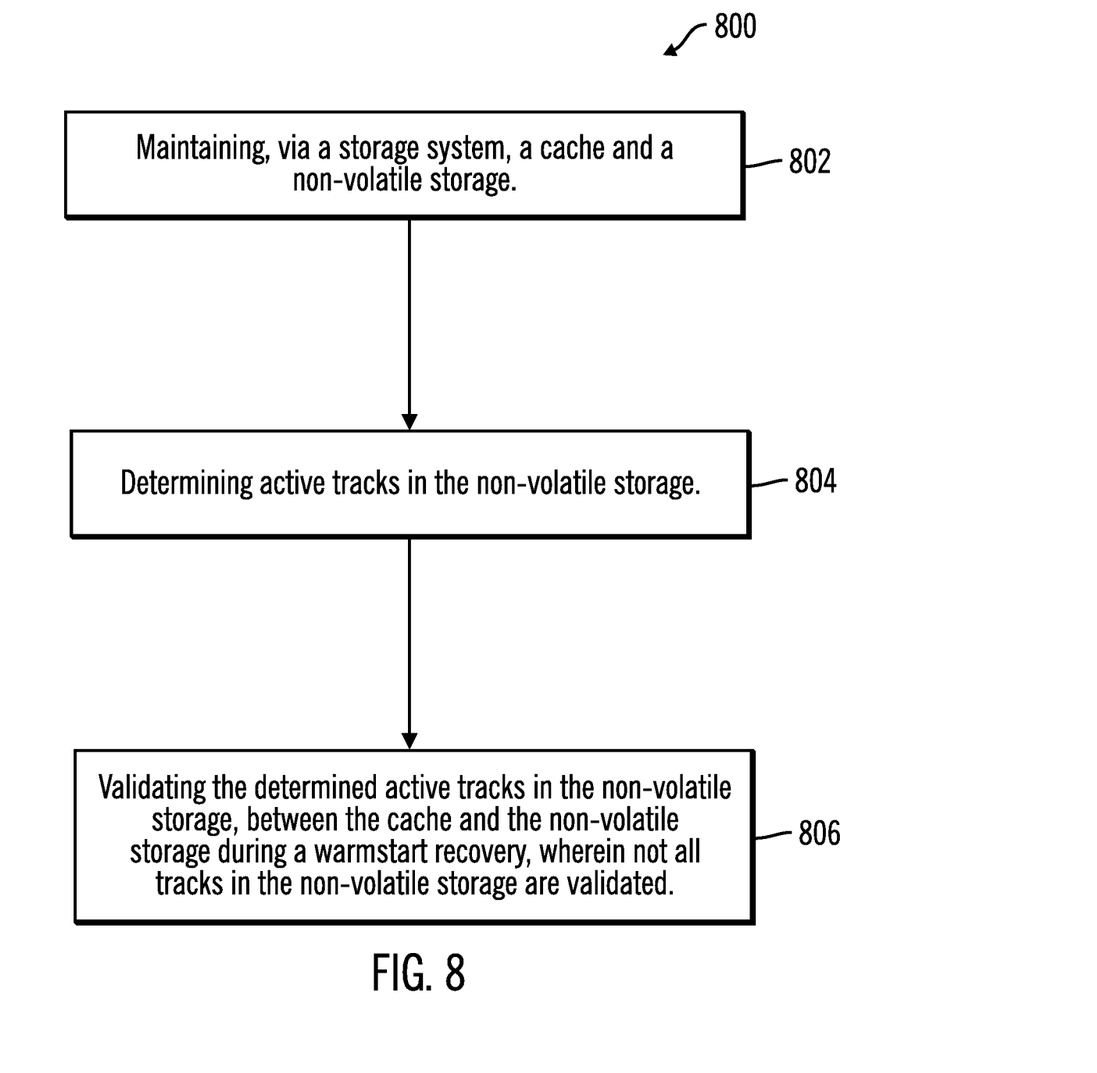
FIG. 8 illustrates a flowchart that shows the validating of only active non-volatile storage tracks between the cache and the non-volatile storage during a warmstart to reduce the recovery time for warmstart, in accordance with certain embodiments.

FIG. 8 illustrates a flowchart 800 that shows the validating of only active non-volatile storage tracks between the cache and the non-volatile storage during a warmstart to reduce the recovery time for warmstart, in accordance with certain embodiments.

Control starts at block 802 in which a storage system, maintains a cache 112 and a non-volatile storage 118. Active tracks in the non-volatile storage 118 are determined (at block 804). The determined active tracks in the non-volatile storage 118 are validated (at block 806) between the cache 112 and the non-volatile storage 118 during a warmstart recovery to reduce recovery time for warmstart. It may be noted not all the tracks in the non-volatile storage 118 are validated and only active tracks in the non-volatile storage 118 are validated.

Therefore FIGS. 1-8 illustrate certain embodiments in which only active tracks in a non-volatile storage (e.g. NVS 114, 118) are validated during a warmstart recovery.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
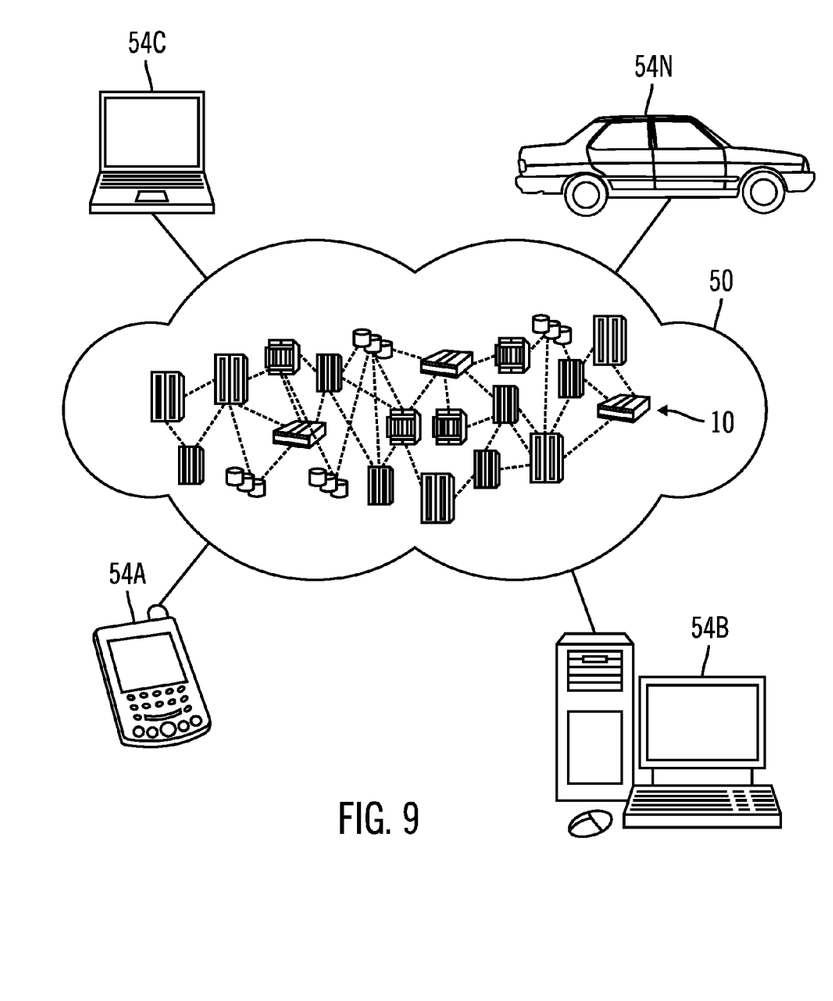
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
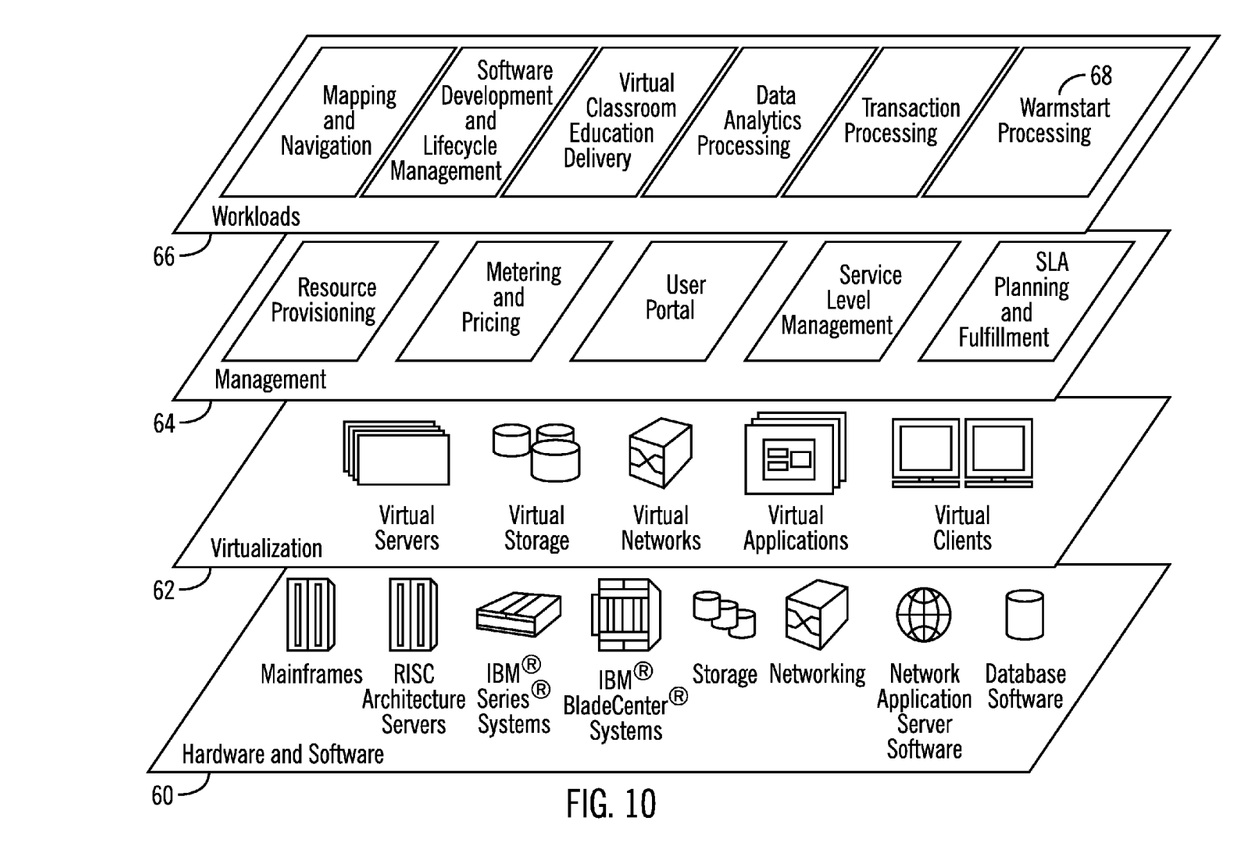
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the driver software and warm-start processing 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
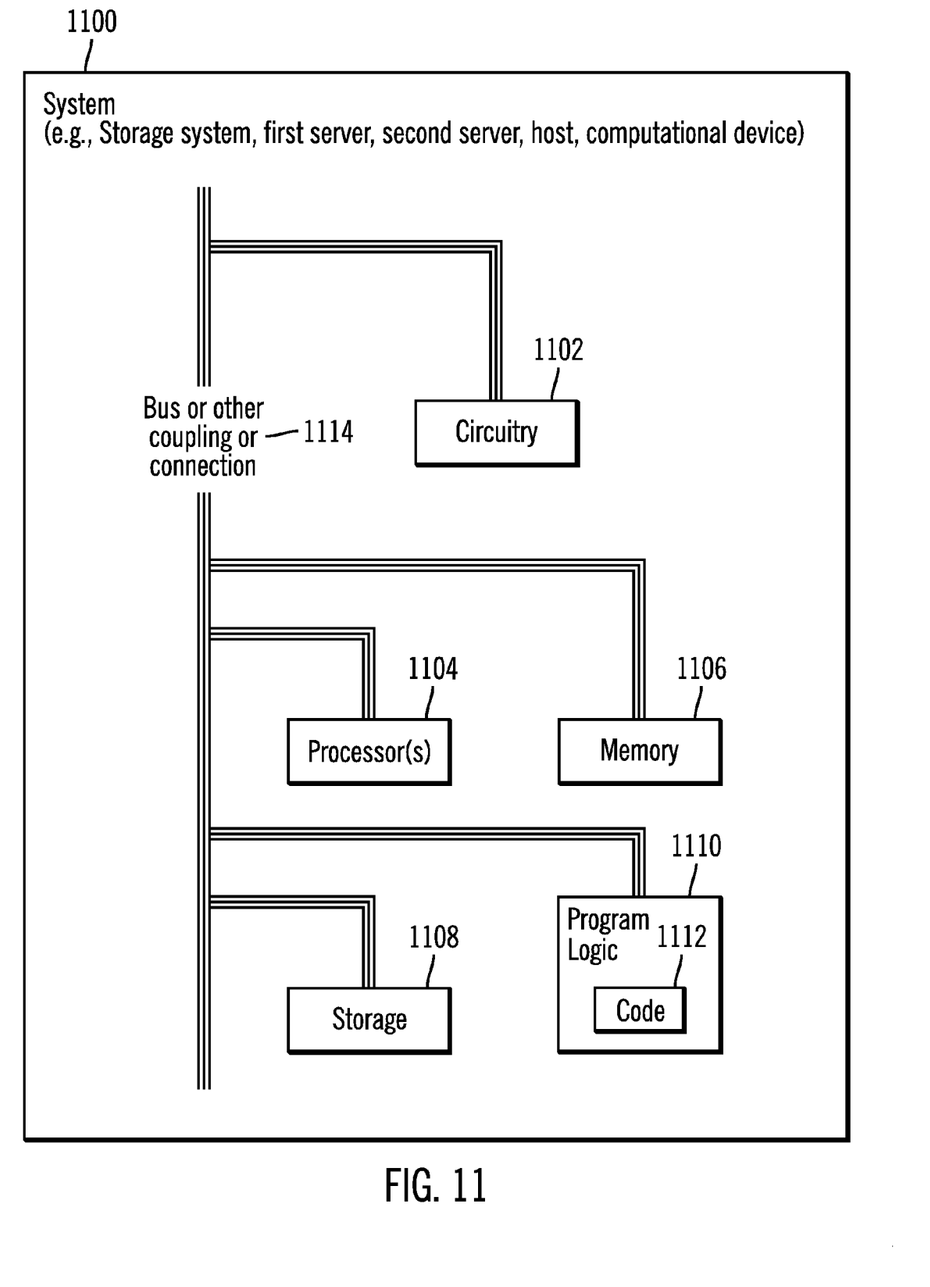
FIG. 11 illustrates a block diagram of a computational system that shows certain elements that may be included in the storage system and/or the host(s), as described in FIGS. 1-10, in accordance with certain embodiments.

FIG. 11 illustrates a block diagram that shows certain elements that may be included in the storage system 102, the first server 104, the second server 106, the hosts 108, 110 or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   maintaining, via a storage system, a cache and a non-volatile storage;
   determining a set of tracks in the non-volatile storage, wherein the determined set of tracks are fewer in number than all tracks present in the non-volatile storage; and
   validating the determined set of tracks in the non-volatile storage, between the cache and the non-volatile storage during a warmstart recovery, wherein not all tracks in the non-volatile storage are validated between the cache and the non-volatile storage during the warmstart recovery, wherein tracks in the cache are added to a list of non-volatile storage tracks that are to be validated, in response to at least determining that the tracks in the cache are also present in the non-volatile storage, and wherein the list of non-volatile storage tracks that are to be validated comprise the determined set of tracks in the non-volatile storage.

2. The method of claim 1, wherein for a first category of tracks that do not have existing segments in the non-volatile storage and only has new segments for a current write in the non-volatile storage, the cache sends a list of new non-volatile storage segments for a track to the non-volatile storage to determine if any of the segments are used for the track.

3. The method of claim 2, wherein for a second category of tracks that has existing segments in the non-volatile storage and may have new segments for a current write in the non-volatile storage, the cache sends a non-volatile storage segment number where a non-volatile storage control block should exist, to the non-volatile storage.

4. The method of claim 3, wherein if a non-volatile storage control block is found for the track then the non-volatile storage control block is sent to the cache to be validated with a cache track.

5. The method of claim 1, wherein the tracks in the cache are also added to the list of non-volatile storage tracks that are to be validated, based on counts stored in one or more control blocks associated with the cache.

6. The method of claim 5, wherein the one or more control blocks include:
   a cache directory control block and a cache segment control block that stores the counts;
   a scatter index table that provides indications of every track in the cache;
   a cache active entries list that is generated by processing the scatter index table; and
   a non-volatile storage active entries list that comprises the list of non-volatile storage tracks that are to be validated, wherein the non-volatile storage active entries list includes fewer entries than the cache active entries list.

7. The method of claim 1, wherein during the warmstart recovery, tracks in the cache are not in synchronization with tracks in the non-volatile storage if at least a write is in progress to a selected track of the cache but a commit of the write has not been performed to the non-volatile storage.

8. A system, comprising:
   a memory; and
   a processor coupled to the memory, wherein the processor performs operations, the operations comprising:
   maintaining a cache and a non-volatile storage;
   determining a set of tracks in the non-volatile storage, wherein the determined set of tracks are fewer in number than all tracks present in the non-volatile storage; and
   validating the determined set of tracks in the non-volatile storage, between the cache and the non-volatile storage during a warmstart recovery, wherein not all tracks in the non-volatile storage are validated between the cache and the non-volatile storage during the warmstart recovery, wherein tracks in the cache are added to a list of non-volatile storage tracks that are to be validated, in response to at least determining that the tracks in the cache are also present in the non-volatile storage, and wherein the list of non-volatile storage tracks that are to be validated comprise the determined set of tracks in the non-volatile storage.

9. The system of claim 8, wherein for a first category of tracks that do not have existing segments in the non-volatile storage and only has new segments for a current write in the non-volatile storage, the cache sends a list of new non-volatile storage segments for a track to the non-volatile storage to determine if any of the segments are used for the track.

10. The system of claim 9, wherein for a second category of tracks that has existing segments in the non-volatile storage and may have new segments for a current write in the non-volatile storage, the cache sends a non-volatile storage segment number where a non-volatile storage control block should exist, to the non-volatile storage.

11. The system of claim 10, wherein if a non-volatile storage control block is found for the track then the non-volatile storage control block is sent to the cache to be validated with a cache track.

12. The system of claim 8, wherein the tracks in the cache are also added to the list of non-volatile storage tracks that are to be validated, based on counts stored in one or more control blocks associated with the cache.

13. The system of claim 12, wherein the one or more control blocks include:
- a cache directory control block and a cache segment control block that stores the counts;
- a scatter index table that provides indications of every track in the cache;
- a cache active entries list that is generated by processing the scatter index table; and
- a non-volatile storage active entries list that comprises the list of non-volatile storage tracks that are to be validated, wherein the non-volatile storage active entries list includes fewer entries than the cache active entries list.

14. The system of claim 8, wherein during the warmstart recovery, tracks in the cache are not in synchronization with tracks in the non-volatile storage if at least a write is in progress to a selected track of the cache but a commit of the write has not been performed to the non-volatile storage.

15. A computer program product, the computer program product comprising a computer readable storage medium having computer readable program code embodied therewith, the computer readable program code configured to perform operations in a storage system, the operations comprising:
- maintaining a cache and a non-volatile storage;
- determining a set of tracks in the non-volatile storage, wherein the determined set of tracks are fewer in number than all tracks present in the non-volatile storage; and
- validating the determined set of tracks in the non-volatile storage, between the cache and the non-volatile storage during a warmstart recovery, wherein not all tracks in the non-volatile storage are validated between the cache and the non-volatile storage during the warmstart recovery, wherein tracks in the cache are added to a list of non-volatile storage tracks that are to be validated, in response to at least determining that the tracks in the cache are also present in the non-volatile storage, and wherein the list of non-volatile storage tracks that are to be validated comprise the determined set of tracks in the non-volatile storage.

16. The computer program product of claim 15, wherein for a first category of tracks that do not have existing segments in the non-volatile storage and only has new segments for a current write in the non-volatile storage, the cache sends a list of new non-volatile storage segments for a track to the non-volatile storage to determine if any of the segments are used for the track.

17. The computer program product of claim 16, wherein for a second category of tracks that has existing segments in the non-volatile storage and may have new segments for a current write in the non-volatile storage, the cache sends a non-volatile storage segment number where a non-volatile storage control block should exist, to the non-volatile storage, and wherein if a non-volatile storage control block is found for the track then the non-volatile storage control block is sent to the cache to be validated with a cache track.

18. The computer program product of claim 15, wherein the tracks in the cache are also added to the list of non-volatile storage tracks that are to be validated, based on counts stored in one or more control blocks associated with the cache.

19. The computer program product of claim 18, wherein the one or more control blocks include:
- a cache directory control block and a cache segment control block that stores the counts;
- a scatter index table that provides indications of every track in the cache;
- a cache active entries list that is generated by processing the scatter index table; and
- a non-volatile storage active entries list that comprises the list of non-volatile storage tracks that are to be validated, wherein the non-volatile storage active entries list includes fewer entries than the cache active entries list.

20. The computer program product of claim 15, wherein during the warmstart recovery, tracks in the cache are not in synchronization with tracks in the non-volatile storage if at least a write is in progress to a selected track of the cache but a commit of the write has not been performed to the non-volatile storage.

* * * * *